United States Patent
Himmelmann

(10) Patent No.: US 9,732,818 B2
(45) Date of Patent: *Aug. 15, 2017

(54) AXIAL ENGAGEMENT-CONTROLLED VARIABLE DAMPER SYSTEMS AND METHODS

(71) Applicant: Goodrich Corporation, Charlotte, NC (US)

(72) Inventor: Richard A. Himmelmann, Beloit, WI (US)

(73) Assignee: GOODRICH CORPORATION, Charlotte, NC (US)

(*) Notice: Subject to any disclaimer, the term of this patent is extended or adjusted under 35 U.S.C. 154(b) by 188 days.

This patent is subject to a terminal disclaimer.

(21) Appl. No.: 14/882,238

(22) Filed: Oct. 13, 2015

(65) Prior Publication Data

US 2017/0102044 A1   Apr. 13, 2017

Related U.S. Application Data

(63) Continuation of application No. 14/882,140, filed on Oct. 13, 2015.

(51) Int. Cl.
*H02P 3/06* (2006.01)
*F16F 6/00* (2006.01)
(Continued)

(52) U.S. Cl.
CPC .............. *F16F 6/005* (2013.01); *B64C 25/34* (2013.01); *B64C 25/505* (2013.01); *B64C 25/58* (2013.01);
(Continued)

(58) Field of Classification Search
CPC ............... F16F 6/005; H02K 1/22; H02P 3/06
(Continued)

(56) References Cited

U.S. PATENT DOCUMENTS 4,663,581 A   5/1987   Glennon
5,064,029 A   11/1991  Araki
(Continued)

FOREIGN PATENT DOCUMENTS

CN   202503378    10/2012
CN   103208893    7/2013
(Continued)

OTHER PUBLICATIONS

Office Action dated Feb. 1, 2017 in U.S. Appl. No. 14/882,086.
(Continued)

*Primary Examiner* — Kawing Chan
(74) *Attorney, Agent, or Firm* — Snell & Wilmer L.L.P.

(57) ABSTRACT

The present disclosure provides an axial engagement-controlled variable damper comprising a rotor assembly coupled to a rotor shaft and disposed about an axis of rotation and a stator, coaxially aligned with the rotor assembly. The axial engagement-controlled variable damper may further comprise a flux sleeve, axially movable relative to the rotor assembly between at least a first position and a second position. The flux sleeve may comprise a circumferential flange portion disposed radially between the rotor assembly and the stator, and may be configured to alter magnetic coupling between the stator and the rotor assembly in response being moved axially. The axial-engagement controlled variable damper may be configured to generate a first drag torque in response to the flux sleeve being in the first position and a second drag torque in response to the flux sleeve being in the second position.

20 Claims, 14 Drawing Sheets

(51) Int. Cl.
| | |
|---|---|
| *B64C 25/58* | (2006.01) |
| *B64C 25/34* | (2006.01) |
| *B64C 25/50* | (2006.01) |
| *H02K 1/22* | (2006.01) |
| *H02K 5/24* | (2006.01) |
| *H02K 7/00* | (2006.01) |
| *H02K 49/02* | (2006.01) |
| *H02K 49/04* | (2006.01) |

(52) U.S. Cl.
CPC ............... *H02K 1/22* (2013.01); *H02K 5/24* (2013.01); *H02K 7/003* (2013.01); *H02K 49/02* (2013.01); *H02K 49/043* (2013.01); *H02P 3/06* (2013.01)

(58) Field of Classification Search
USPC .................................................. 318/540, 538
See application file for complete search history.

(56) References Cited

U.S. PATENT DOCUMENTS

| | | | |
|---|---|---|---|
| 5,236,069 | A | 8/1993 | Peng |
| 5,238,095 | A | 8/1993 | Pedu |
| 5,711,404 | A | 1/1998 | Lee |
| 5,714,823 | A | 2/1998 | Shervington et al. |
| 5,803,404 | A | 9/1998 | Petrou |
| 6,176,355 | B1 | 1/2001 | Yamamoto |
| 6,557,673 | B1 | 5/2003 | Desta |
| 6,936,948 | B2 | 8/2005 | Bell et al. |
| 6,948,597 | B2 | 9/2005 | Kuwahara |
| 6,965,183 | B2 | 11/2005 | Dooley |
| 7,126,313 | B2 | 10/2006 | Dooley |
| 7,583,063 | B2 | 9/2009 | Dooley |
| 7,919,894 | B2 | 4/2011 | Dooley |
| 7,923,874 | B2 | 4/2011 | Himmelmann |
| 8,878,657 | B2 | 11/2014 | Periquet |
| 2007/0096581 | A1 | 5/2007 | Zepp et al. |
| 2008/0042509 | A1 | 2/2008 | Dooley et al. |
| 2008/0079401 | A1 | 4/2008 | Dooley |
| 2008/0088195 | A1 | 4/2008 | Dooley et al. |
| 2010/0044144 | A1 | 2/2010 | Tajima et al. |
| 2010/0264768 | A1 | 10/2010 | Alfermann et al. |
| 2010/0323804 | A1 | 12/2010 | Himmelmann |
| 2011/0006545 | A1 | 1/2011 | Himmelmann |
| 2011/0062805 | A1 | 3/2011 | Savant |
| 2011/0101817 | A1 | 5/2011 | Hao et al. |
| 2013/0187504 | A1 | 7/2013 | Tanaka |
| 2015/0060219 | A1* | 3/2015 | Wolfle .................. F16D 57/04 188/296 |
| 2015/0090545 | A1 | 4/2015 | Zuo et al. |

FOREIGN PATENT DOCUMENTS

| | | |
|---|---|---|
| CN | 104578659 | 4/2015 |
| EP | 0367387 | 5/1990 |
| EP | 1367701 | 12/2003 |
| EP | 2778047 | 9/2014 |
| EP | 2916032 | 9/2015 |
| GB | 2192041 | 12/1987 |
| GB | 2500442 | 9/2013 |
| JP | H0274146 | 3/1990 |
| WO | 2010064978 | 6/2010 |
| WO | 2011110857 | 9/2011 |

OTHER PUBLICATIONS

U.S. Appl. No. 14/882,140, filed Oct. 13, 2015 and entitled Axial Engagement-Controlled Variable Damper Systems and Methods.
U.S. Appl. No. 14/882,086, filed Oct. 13, 2015 and entitled Saturation-Controlled Variable Damper Systems and Methods.
Extended European Search Report dated Apr. 28, 2017 in European Application No. 16193472.4.
Extended European Search Report dated Apr. 28, 2017 in European Application No. 16193658.8.
Notice of Allowance dated May 22, 2017 in U.S. Appl. No. 14/882,086.

* cited by examiner

AXIAL ENGAGEMENT-CONTROLLED VARIABLE DAMPER SYSTEMS AND METHODS

CROSS REFERENCE TO RELATED APPLICATIONS

This application is a continuation of, and claims priority to and the benefit of, U.S. Ser. No. 14/882,140 filed Oct. 13, 2015 entitled "AXIAL ENGAGEMENT-CONTROLLED VARIABLE DAMPER SYSTEMS AND METHODS," the entire contents of which is hereby incorporated by reference.

FIELD OF THE DISCLOSURE

The present disclosure relates to variable damper systems and methods, and more particularly, to axial engagement-controlled variable damper systems and methods.

BACKGROUND OF THE DISCLOSURE

Aircraft nose wheel actuators may comprise a rotary damper to address shimmy in the nose wheel. The rotary damper may comprise a permanent magnet electric machine configured to create drag on the nose wheel actuator through rotation of a motor shaft and permanent magnet assembly about an electromagnetic stator.

Typically, such rotary dampers have a fixed damping coefficient. Stated differently, such rotary dampers create drag torque proportional to the speed of the motor shaft by a fixed damping coefficient. However, drag torque decreases efficiency of the nose wheel actuator. Rotary dampers with a fixed damping coefficient create constant drag torque, limiting the responsiveness and performance of the nose wheel actuator. Moreover, size requirements for the nose wheel actuator may increase in order to overcome the fixed drag torque created by rotary dampers having a fixed damping coefficient.

SUMMARY OF THE DISCLOSURE

In various embodiments, the present disclosure provides an axial engagement-controlled variable damper comprising a rotor assembly coupled to a rotor shaft and disposed about an axis of rotation, a stator, coaxially aligned with the rotor assembly, and a flux sleeve, axially movable relative to the rotor assembly between at least a first position and a second position and having a circumferential flange portion disposed radially between the rotor assembly and the stator. In various embodiments, the flux sleeve is configured to alter magnetic coupling between the stator with the rotor assembly in response being moved axially. In various embodiments, the axial-engagement controlled variable damper is configured to generate a first drag torque in response to the flux sleeve being in the first position and a second drag torque in response to the flux sleeve being in the second position.

In various embodiments, the axial engagement-controlled variable damper further comprises an additional flux sleeve axially movable relative to the rotor assembly and having an additional circumferential flange portion disposed radially between the rotor assembly and the stator. In various embodiments, the axial engagement-controlled variable damper further comprises at least one flux sleeve actuator configured to move at least one of the flux sleeve and the additional flux sleeve. In various embodiments, the flux sleeve actuator comprises a passive actuator. In various embodiments, the flux sleeve actuator comprises a hydraulic actuator. In various embodiments, the axial engagement-controlled variable damper further comprises a rotor hub. In various embodiments, the flux sleeve comprises an electromagnetic material. In various embodiments, the stator comprises at least one of a plurality of laminations or a conductive winding.

In various embodiments, the present disclosure provides an axial engagement-controlled variable damper comprising a stator disposed about an axis of rotation, a rotor assembly, coaxially aligned with the stator, the rotor assembly being axially movable relative to the stator between at least a first position and a second position. In various embodiments, the axial engagement-controlled variable damper is configured to generate a first drag torque in response to magnetic coupling between the stator and the rotor assembly when the rotor assembly is in the first position and to generate a second drag torque in response to the rotor assembly being in the second position.

In various embodiments, the rotor assembly comprises a first rotor portion and a second rotor portion. In various embodiments, the axial engagement-controlled variable damper further comprises at least one rotor actuator. In various embodiments, the rotor actuator comprises a passive actuator. In various embodiments, the rotor actuator comprises a hydraulic actuator. In various embodiments, the axial engagement-controlled variable damper further comprises a rotor hub. In various embodiments, the stator comprises at least one of a plurality of laminations or a conductive winding.

In various embodiments, the present disclosure provides a method comprising moving at least one of a flux sleeve and at least a portion of a rotor assembly between a first position and a second position relative to a stator of an axial engagement-controlled variable damper, and generating a first drag torque in response to the at least one of the flux sleeve and at least a portion of the rotor assembly being in the first position and a second drag torque in response to the at least one of the flux sleeve and at least a portion of the rotor assembly being in the second position.

In various embodiments, in response to the moving increasing axial engagement between the stator and at least a portion of the rotor assembly, the first drag torque is greater than the second drag torque. In various embodiments, in response to the moving decreasing axial engagement between the stator and at least a portion of the rotor assembly, the first drag torque is less than the second drag torque.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, systems and methods may find particular use in connection with aircraft nose wheel rotary dampers. However, various aspects of the disclosed embodiments may be adapted for optimized performance with a variety of damper systems and methods. As such, numerous applications of the present disclosure may be realized.

Figure 1:
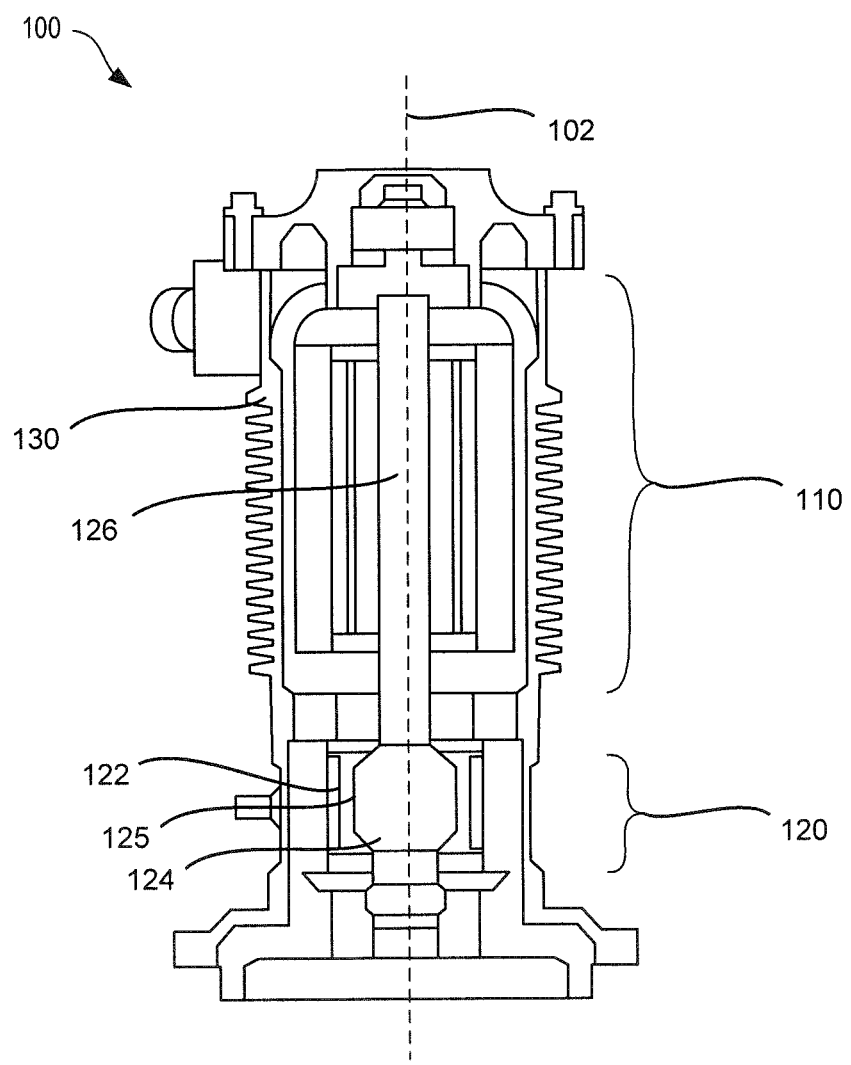
FIG. 1 illustrates a cross section view of a nose wheel actuator assembly in accordance with various embodiments.

Referring to FIG. 1 and in accordance with various embodiments, a nose wheel actuator assembly 100 may comprise a motor portion 110, a damper portion 120, and a housing 130 configured to at least partially surround motor portion 110 and damper portion 120. The nose wheel actuator assembly 100 is disposed about an axis of rotation 102. The motor portion 110 is configured to generate power to steer a nose wheel of an aircraft.

In various embodiments, the damper portion 120 may comprise a permanent magnet electric machine. In such embodiments, the damper portion 120 may comprise a stator 122 coaxially aligned with a rotor assembly 124 and disposed about a rotor shaft 126. In various embodiments, the stator 122 may comprise a conductive material. In various embodiments, the rotor assembly 124 may comprise one or more permanent magnets 125. During rotation of the rotor shaft 126, the permanent magnets 125 disposed on the rotor assembly 124 rotate relative to the stator 122, creating eddy currents in the damper portion 120. Such eddy currents create electromagnetic drag torque on the motor portion 110. FIG. 1 provides a general understanding of various the portions of a nose wheel actuator assembly, and is not intended to limit the disclosure.

In various embodiments, an axial engagement-controlled variable damper may comprise a stator coaxially aligned with, and disposed about, a rotor assembly, such that the stator is configured to generate a first drag torque in response to magnetic coupling of the stator with the rotor assembly. In various embodiments, the axial engagement-controlled variable damper may be configured to adjustably control magnetic coupling of the stator with the rotor assembly through axial translation of a portion of the axial engagement-controlled variable damper. In various embodiments, axial translation of a flux sleeve at least partially between the stator and the rotor assembly may decrease magnetic coupling of the stator with the rotor assembly. In various embodiments, axial translation of the rotor assembly at least partially into axial alignment with the stator may increase magnetic coupling of the stator with the rotor assembly. In various embodiments, axial translation of the rotor assembly at least partially out of axial alignment with the stator may decrease magnetic coupling of the stator with the rotor assembly.

Figure 2:
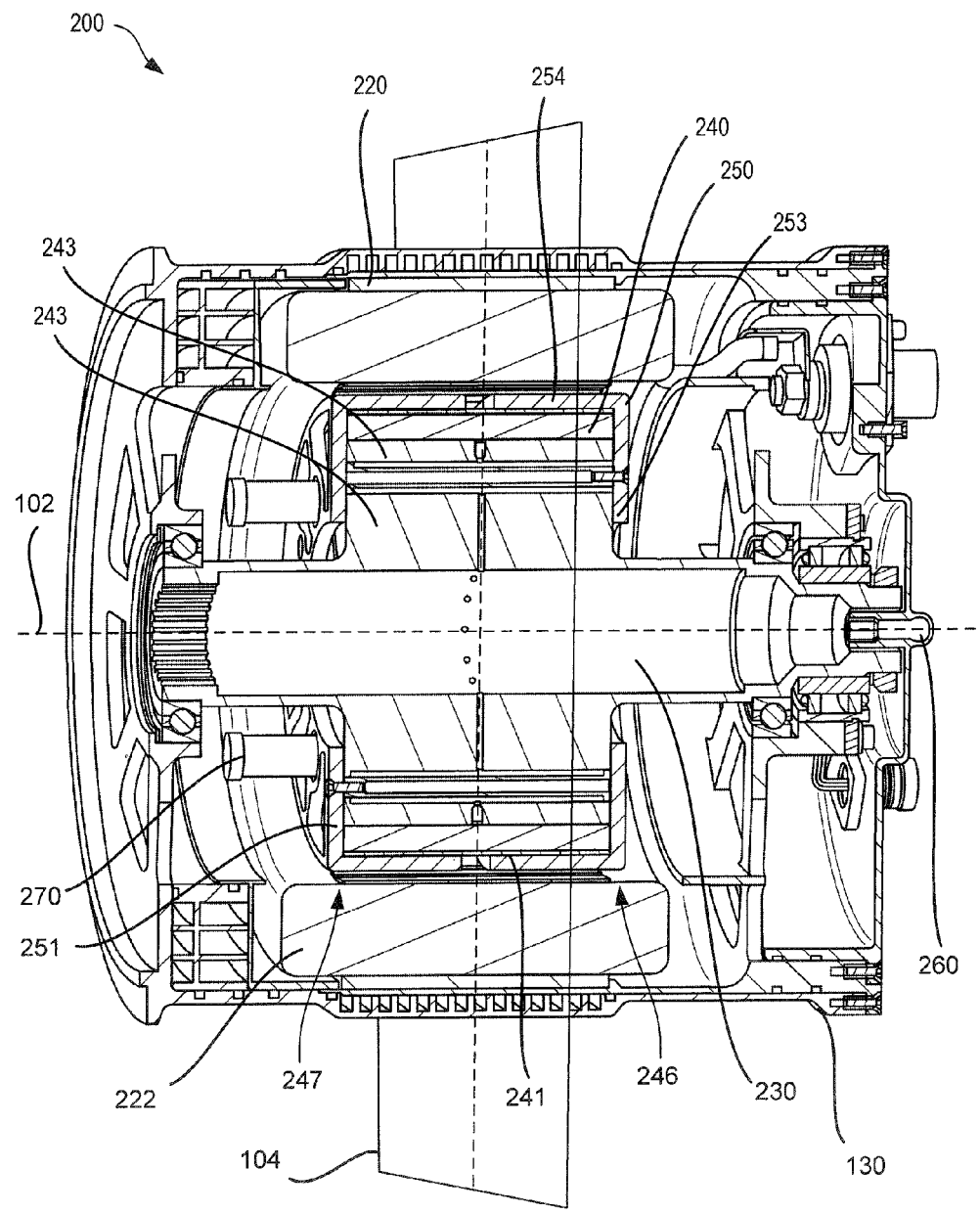
FIG. 2 illustrates a cut-away perspective view of an axial engagement-controlled variable damper in accordance with various embodiments.
Figure 3:
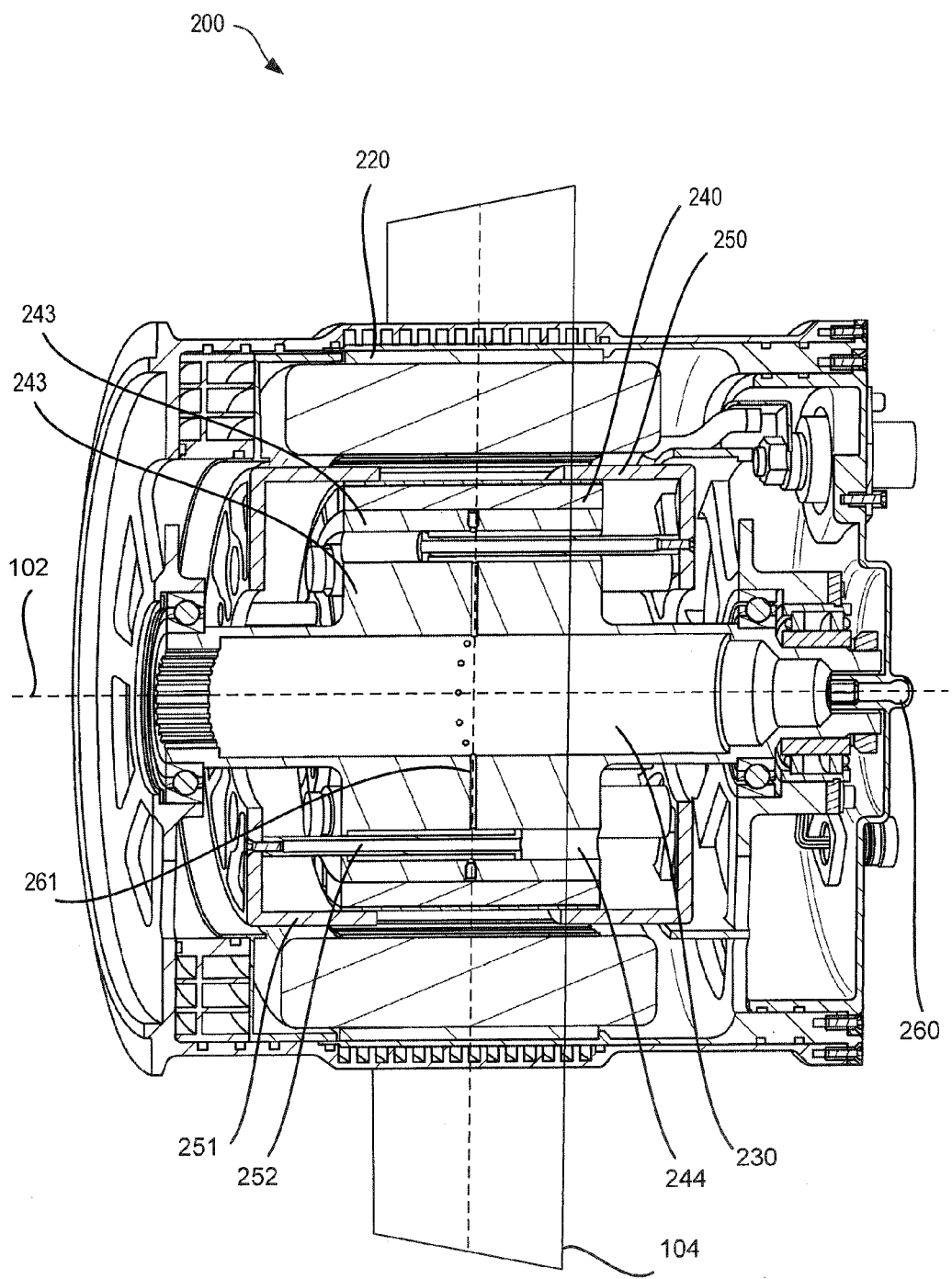
FIG. 3 illustrates another cut-away perspective view of an axial engagement-controlled variable damper in accordance with various embodiments.
Figure 4A:
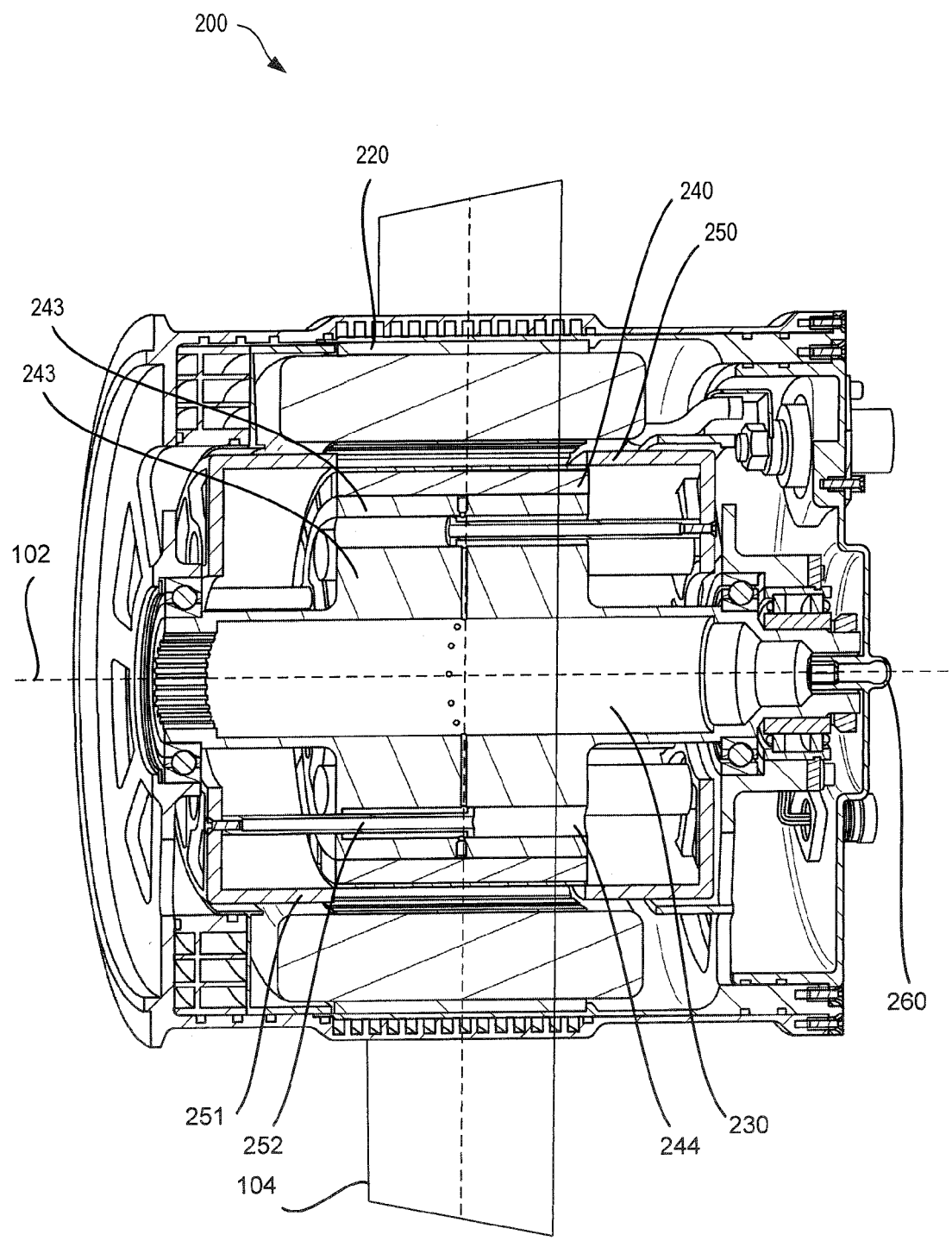
FIG. 4a illustrates another cut-away perspective view of an axial engagement-controlled variable damper in accordance with various embodiments.

With reference to FIGS. 2a, 3a, and 4a, an axial engagement-controlled variable damper 200 may comprise a rotor assembly 240. In various embodiments, the rotor assembly 240 may be coupled to a rotor shaft 230 and disposed about an axis of rotation 102. In various embodiments, the rotor assembly 240 and the rotor shaft 230 are configured to rotate about the axis of rotation 102. In various embodiments, the rotor assembly 240 may comprise a plurality of permanent magnets arranged in a generally cylindrical pattern facing radially outward from the rotor shaft 230. In various embodiments, the rotor assembly 240 may further comprise a retention sleeve portion 241 configured to couple the plurality of permanent magnets to the rotor assembly 240. In various embodiments, the axial engagement-controlled variable damper 200 may further comprise a rotor hub 243. In various embodiments, the rotor hub 243 may be configured to receive the rotor assembly 240 and/or couple the rotor assembly 240 to the rotor shaft 230.

In various embodiments, a stator 220 may be coaxially aligned with, and disposed about, the rotor assembly 240. In various embodiments, the stator 220 may comprise an electromagnetic material. In various embodiments, the stator 220 may comprise at least one of a metal, a metal alloy, or a combination of one or more metals or alloys. In various embodiments, the stator 220 may comprise steel. However, in various embodiments, the stator 220 may comprise any material suitable for use in the axial engagement-controlled variable damper 200.

In various embodiments, the stator 220 may comprise a plurality of laminations. In various embodiments, the stator 220 may lack laminations and/or may comprise a unitary member. In various embodiments, the stator 220 may further comprise one or more stator windings 222. The stator windings 222 may comprise a conductive wire and/or foil wound at least partially about the stator 220. In various embodiments, the stator windings 222 may act as a rotational sensor.

In various embodiments, rotation of the rotor shaft 230 causes rotation of the rotor assembly 240 and the plurality of permanent magnets within the stator 220. In various embodiments, such rotation may cause magnetic coupling of the rotor assembly 240 with the stator 220. In various embodiments, such rotation may create eddy currents in the stator 220. Stated differently, in various embodiments, the interaction of the plurality of permanent magnets and the stator 220 may create alternating magnetic flux within the axial engagement-controlled variable damper 200. In various embodiments, such magnetic coupling and/or alternating magnetic flux may generate a first drag torque.

In various embodiments, the axial engagement-controlled variable damper 200 may further comprise a flux sleeve 250 coaxially aligned with the rotor shaft 230 about the axis of rotation 102. In various embodiments, the flux sleeve 250 may comprise a radial portion 253 and a circumferential flange portion 254, wherein the circumferential flange portion 254 extends in an axial direction from an outer circumference of the radial portion 253. In various embodiments, the circumferential flange portion 254 of flux sleeve 250 may be disposed radially outward of the rotor assembly 240 and radially inward of the stator 220.

In various embodiments, the flux sleeve 250 may comprise an electromagnetic material. In various embodiments, the flux sleeve 250 may comprise steel, aluminum, and/or any other suitable metal, alloy, or a composite material configured to communicate magnetic flux. In various embodiments, the flux sleeve 250 may be operatively coupled to the rotor assembly 240 and configured to rotate with the rotor assembly 240 such that interaction of the rotor assembly 240 with the flux sleeve 250 does not cause the axial engagement-controlled variable damper 200 to generate drag torque.

In various embodiments, the flux sleeve 250 is configured for axial translation and/or insertion between the rotor assembly 240 and the stator 220. In various embodiments, such insertion may alter magnetic coupling of the stator 220 with the rotor assembly 240. Stated differently, magnetic coupling of the stator 220 with the rotor assembly 240 may be disrupted and/or decreased at portions of the axial engagement-controlled variable damper 200 at which the stator 220 and the rotor assembly 240 are not in direct axial engagement but, instead, at which the flux sleeve 250 is disposed axially between the stator 220 and the rotor assembly 240.

In various embodiments, the axial engagement-controlled variable damper 200 may further comprise an additional flux sleeve 251. In various embodiments, the flux sleeve 250 may be disposed at a first axial end 246 of the rotor assembly 240 and the additional flux sleeve 251 may be disposed at a second axial end 247 of the rotor assembly 240. In various embodiments, the first sleeve 250 and the additional flux sleeve 251 may be disposed on opposite sides of an axial plane 104 which transversely bisects the stator 220 and the rotor assembly 240 substantially at their axial midpoints. In various embodiments, the circumferential flange portion 254 of the flux sleeve 250 may extend from the first axial end 246 toward the axial plane 104. In various embodiments, the circumferential flange portion 254 of the additional flux sleeve 251 may extend from the second axial end 247 toward the axial plane 104.

In various embodiments, the flux sleeve 250 and the additional flux sleeve 251 may be configured for axial translation towards or away from the axial plane 104. In various embodiments, an axial position of the flux sleeve 250 and/or the additional flux sleeve 251 may affect damping performance of the axial engagement-controlled variable damper 200. For example, FIG. 2a illustrates a first axial position of the flux sleeve 250 and the additional flux sleeve 251 in accordance with various embodiments. In various embodiments, the first axial position may comprise insertion of the circumferential flange portion 254 of the flux sleeve 250 and/or the additional flux sleeve 251 between the stator 220 and the rotor assembly 240 such that the radial portion 253 is disposed substantially adjacent to the first axial end 246 and/or the second axial end 247. In various embodiments, the first axial position may cause a first alteration of magnetic coupling between the stator 220 and the rotor assembly 240; stated differently, the first axial position may decrease, eliminate, and/or minimize magnetic engagement of the stator 220 with the rotor assembly 240.

For example, FIG. 3a illustrates a second axial position of the flux sleeve 250 and the additional flux sleeve 251 in accordance with various embodiments. In various embodiments, the second axial position may comprise partial insertion of the circumferential flange portion 254 of the flux sleeve 250 and/or the additional flux sleeve 251 between the stator 220 and the rotor assembly 240. In various embodiments, the second axial position may cause a second alteration of magnetic coupling between the stator 220 and the rotor assembly 240; stated differently, the second axial position may partially disrupt magnetic coupling and/or may partially limit magnetic engagement of the stator 220 with the rotor assembly 240.

For example, FIG. 4a illustrates a third axial position of the flux sleeve 250 and the additional flux sleeve 251 in accordance with various embodiments. In various embodiments, the third axial position may comprise minimal or no insertion of the circumferential flange portion 254 of the flux sleeve 250 and/or the additional flux sleeve 251 between the stator 220 and the rotor assembly 240. In various embodiments, the third axial position may cause a third alteration of magnetic coupling between the stator 220 and the rotor assembly 240; stated differently, the third axial position may increase magnetic coupling and/or magnetic engagement of the stator 220 with the rotor assembly 240.

Figure 4B:
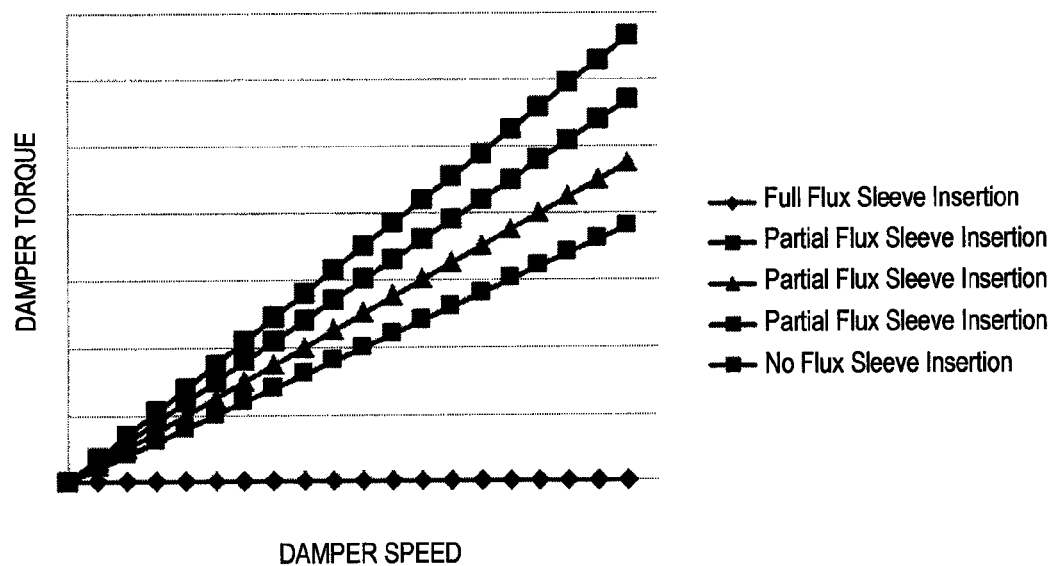
FIG. 4b illustrates test data comparing the performance of an axial engagement-controlled variable damper at various axial positions of a flux sleeve.

As illustrated in FIG. 4b, the axial position of the flux sleeve 250 and/or the additional flux sleeve 251 may affect torque generated by the axial engagement-controlled variable damper 200. FIG. 4b shows a comparison between damping performance at various levels of axial engagement and/or insertion of the flux sleeve 250 and/or the additional flux sleeve 251 between the stator 220 and the rotor assembly 240. The damper rotational speed is shown on the x axis and the drag torque produced is shown on the y axis. As shown in FIG. 4b, increased insertion of the flux sleeve 250 and/or the additional flux sleeve 251 between the stator 220 and rotor assembly 240 decreases the damper torque produced at various damper rotational speeds.

In various embodiments and with reference again to FIG. 2a, the axial engagement-controlled variable damper 200 may further comprise a flux sleeve actuator configured to translate at least one of the flux sleeve 250 or the additional flux sleeve 251 along the axis of rotation 102 in at least one of a first direction or a second direction. In various embodiments, the flux sleeve actuator may comprise an active actuator. In various embodiments, the flux sleeve actuator may comprise a passive actuator. In various embodiments, the flux sleeve actuator may comprise a hydraulic actuator, a pneumatic actuator, and/or a mechanical actuator.

In various embodiments, the axial engagement-controlled variable damper 200 may further comprise at least one return spring 270. In various embodiments, the return spring 270 may be operatively coupled to at least one of the flux sleeve 250 or the additional flux sleeve 251. In various embodiments, the return spring 270 may be configured to apply an opposing axial force to at least one of the flux sleeve 250 or the additional flux sleeve 251 in at least one of a first direction or a second direction.

In various embodiments, the flux sleeve actuator may comprise a hydraulic actuator in fluid communication with at least one of the flux sleeve 250 or the additional flux sleeve 251. In such embodiments, the hydraulic actuator may comprise a port 260 configured to receive hydraulic fluid and in fluid communication with an oil channel 261. In various embodiments, the oil channel 261 may be at least partially disposed in rotor shaft 230, and/or the rotor hub 243. In various embodiments, increased oil pressure through the oil channel 261 may displace at least one of the flux sleeve 250 and the additional flux sleeve 251 in an axial direction along the axis of rotation 102.

In various embodiments, the hydraulic actuator may be an active actuator. In various embodiments, the hydraulic actuator may be controlled by a controller configured to adjustably communicate hydraulic fluid through oil channel 261. In various embodiments, the controller may comprise a processor configured to implement various logical operations in response to execution of instructions, for example, instructions stored on a non-transitory, tangible, computer-readable medium.

In various embodiments, the rotor hub 243 may operatively couple to at least one of the flux sleeve 250 or the additional flux sleeve 251 and may be configured to bring the hydraulic actuator into fluid communication therewith. In such embodiments, the rotor hub 243 may couple to at least one of the flux sleeve 250 and the additional flux sleeve 251 by way of at least one rotor hub aperture 244 that engages at least one mating flux sleeve piston 252. In various embodiments, the mating flux sleeve piston 252 may comprise a generally cylindrical piston that engages a generally cylindrical rotor hub aperture 244. In various embodiments, the rotor hub 243 couples to the flux sleeve 250 by way of a plurality of rotor hub apertures and flux sleeve pistons. In various embodiments, the mating flux sleeve piston 252 may comprise a generally annular projection that engages a generally annular rotor hub aperture 244.

In various embodiments, the hydraulic actuator and the oil channel 261 may be in fluid communication with the rotor hub aperture 244 and the flux sleeve piston 252 such that communication of oil into the rotor hub aperture 244 translates the flux sleeve piston 252 and at least one of the flux sleeve 250 or the additional flux sleeve 251 in an axial direction toward the axial plane 104. In various embodiments, such axial translation causes compression of the return spring 270. Accordingly, in various embodiments, an axial position of the flux sleeve 250 and the additional flux sleeve 251 may be adjustably controlled by the hydraulic actuator.

In various embodiments, the hydraulic actuator may be a passive actuator. In various embodiments, the hydraulic actuator may adjustably communicate hydraulic fluid through oil channel 261 in response to rotation of the rotor shaft 230. In various embodiments, the flux sleeve actuator may comprise a flyweight actuator (described below).

Although the various embodiments shown have illustrated an axial engagement-controlled variable damper having a convention configuration, wherein the permanent magnets are disputed co-axially within the stator, in various embodiments, the axial engagement-controlled variable damper may comprise an inside-out configuration, wherein the permanent magnets are co-axially disputed around an outside circumference of the stator. In various embodiments, the flux sleeve may perform the same function and may translate axially, moving between the rotor assembly and the stator.

Figure 5A:
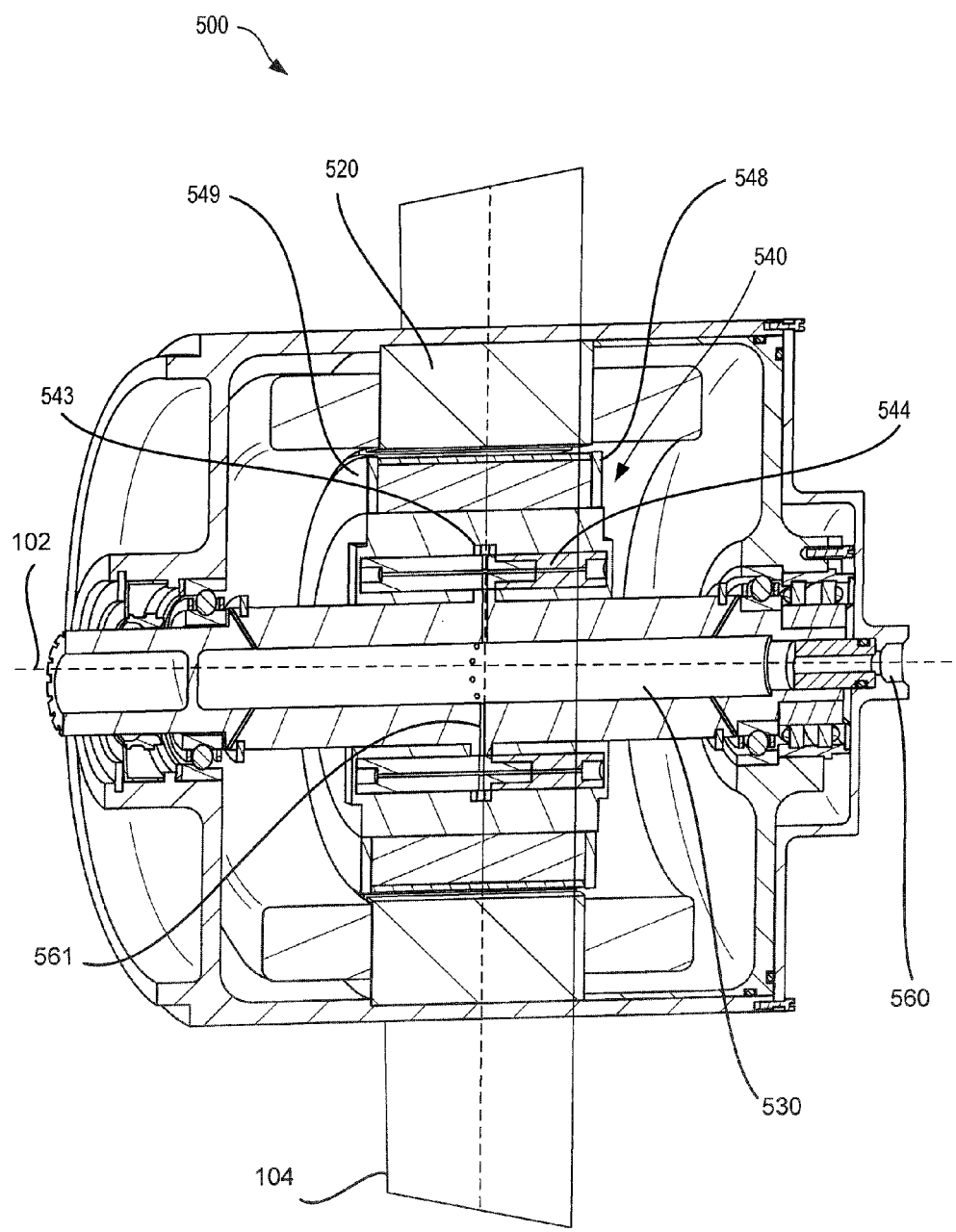
FIG. 5a illustrates yet another cut-away perspective view of an axial engagement-controlled variable damper in accordance with various embodiments.
Figure 5B:
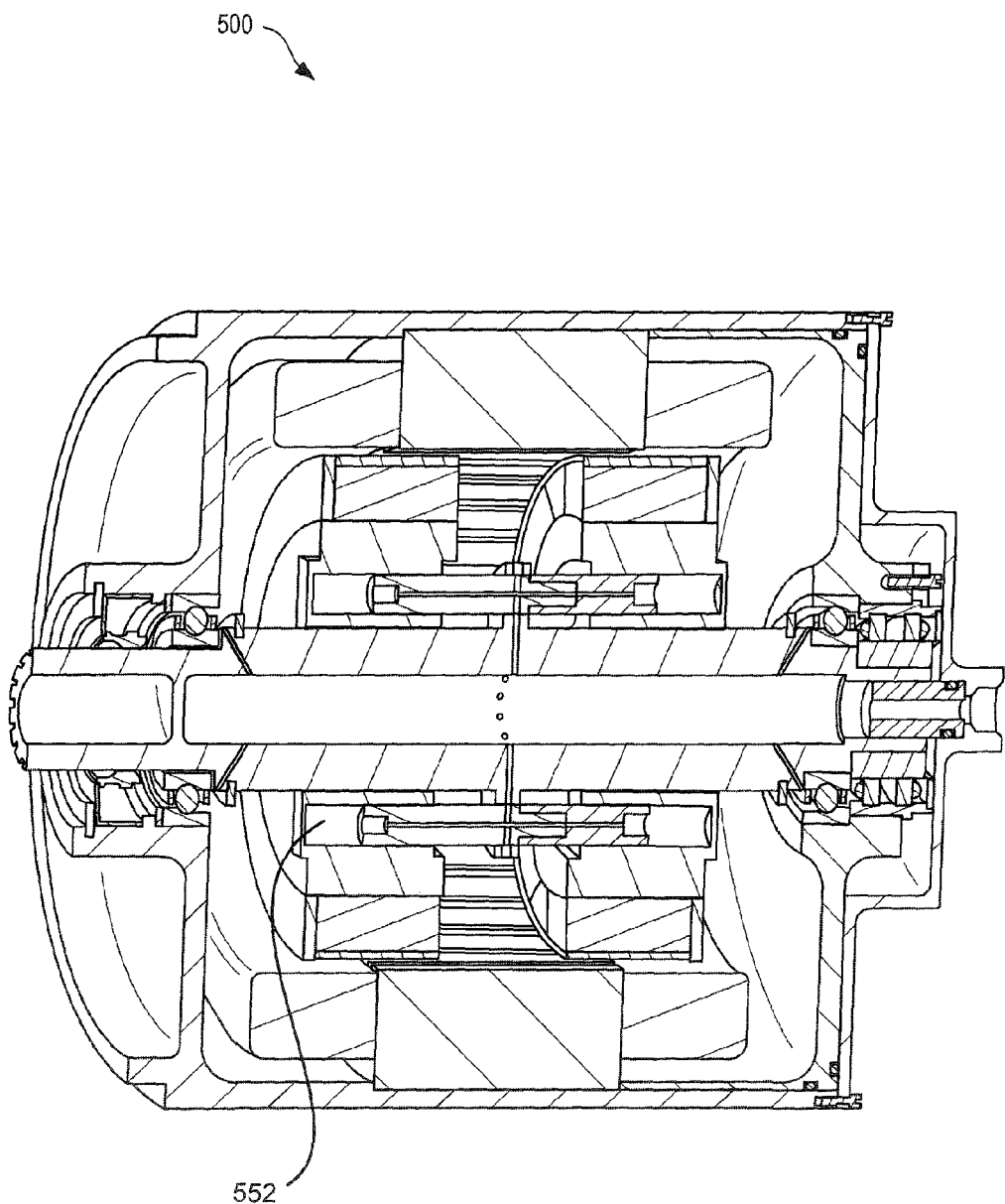
FIG. 5b illustrates yet another cut-away perspective view of an axial engagement-controlled variable damper in accordance with various embodiments.

With reference now to FIGS. 5a and 5b, an axial engagement-controlled variable damper 500 may comprise a rotor assembly 540, a rotor shaft 530, and a stator 520 as already described herein. In various embodiments, the axial engagement-controlled variable damper 500 may further comprise a rotor hub 543 (discussed below). In various embodiments, the axial engagement-controlled variable damper 500 may further comprise a rotor actuator configured to translate the rotor assembly 540 axially along the axis of rotation 102 and relative to the stationary stator 520. In various embodiments, such axial translation may alter magnetic coupling between the stator 220 and the rotor assembly 240. Stated differently, magnetic coupling of the stator 220 with the rotor assembly 240 may be disrupted at the portions of the axial engagement-controlled variable damper 200 at which the stator 220 and the rotor assembly 240 are not in direct axial engagement as a result of axial translation of the rotor assembly 240.

In various embodiments, the axial engagement-controlled variable damper 500 may comprise a split rotor assembly having a first rotor portion 548 and a second rotor portion 549. In various embodiments, the axial engagement-controlled variable damper 500 may comprise an axial plane 104 which transversely bisects the stator 520 substantially at its axial midpoint. In various embodiments, the first rotor portion 548 and the second rotor portion 549 may be disposed substantially axially adjacent to one another on opposite sides of the axial plane 104.

In various embodiments, at least one of the rotor assembly 540, the first rotor portion 548, and the second rotor portion 549 may be configured for axial translation towards or away from the axial plane 104. In various embodiments, an axial position of the rotor assembly 540, the first rotor portion 548, and/or the second rotor portion 549 may affect damping performance of the axial engagement-controlled variable damper 500. For example, FIG. 5a illustrates a first axial position of the first rotor portion 548 and the second rotor portion 549 in accordance with various embodiments. In various embodiments, the first axial position may comprise the axial engagement between stator 520 and the rotor assembly 540 such that substantially all of the rotor assembly 540 is axially aligned with the stator 520. In various embodiments, the first axial position may cause or increase magnetic coupling between the stator 520 and the rotor assembly 540.

For example, FIG. 5b illustrates a second axial position of the first rotor portion 548 and the second rotor portion 549 in accordance with various embodiments. In various embodiments, the second axial position may comprise partial displacement of the first rotor portion 548 and the second rotor portion 549 away from the axial plane 104 and out of axial engagement with the stator 520. In various embodiments, the second axial position may cause partial disruption of magnetic coupling of the stator 520 with the rotor assembly 540; stated differently, the second axial position may partially limit axial engagement of the stator 220 with the rotor assembly 240, thereby decreasing drag torque generated by the axial engagement-controlled variable damper 500.

Figure 5C:
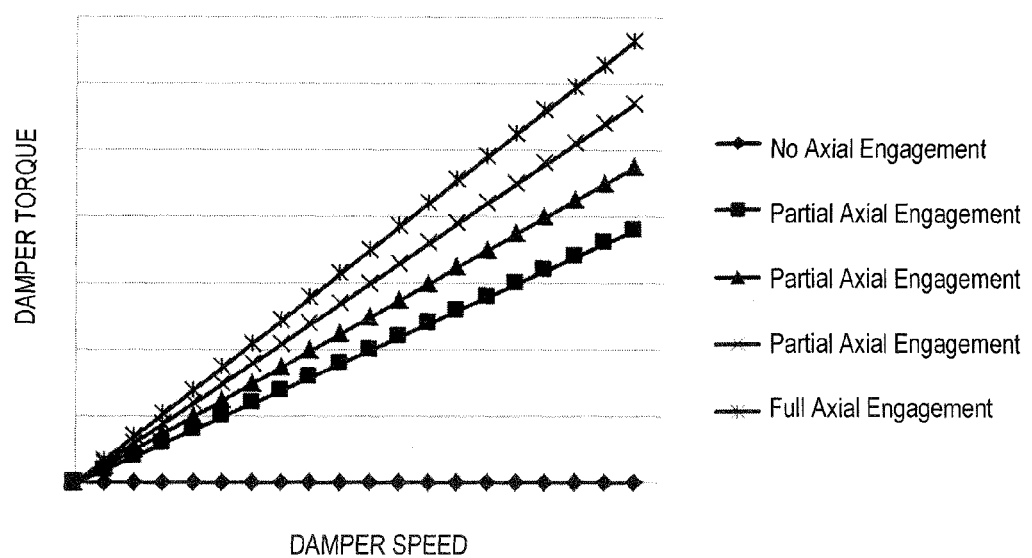
FIG. 5c illustrates test data comparing the performance of an axial engagement-controlled variable damper at various axial positions of a rotor assembly.

As illustrated in FIG. 5c, the axial position of the rotor assembly 540, the first rotor portion 548, and the second rotor portion 549 may affect torque generated by the axial engagement-controlled variable damper 500. FIG. 5c shows a comparison between damping performance at various levels of axial engagement between the stator 520 and at least one of the rotor assembly 540, the first rotor portion 548, and the second rotor portion 549. The damper rotational speed is shown on the x axis and the drag torque produced is shown on the y axis. As shown in FIG. 5c, increased axial engagement between the stator 220 and at least one of the rotor assembly 540, the first rotor portion 548, and the second rotor portion 549 increases the damper torque produced at various damper rotational speeds.

With reference again to FIG. 5a and FIG. 5b, In various embodiments, the axial engagement-controlled variable damper 500 may further comprise a rotor actuator configured to translate at least one of the rotor assembly 540, the first rotor portion 548, or the second rotor portion 549 along the axis of rotation 102 in at least one of a first direction or a second direction. In various embodiments, the rotor actuator may comprise an active actuator. In various embodiments, the rotor actuator may comprise a passive actuator. In various embodiments, the rotor actuator may comprise a hydraulic actuator, a pneumatic actuator, and/or a mechanical or electromechanical actuator.

In various embodiments, the rotor actuator may comprise a hydraulic actuator in fluid communication with at least one of the rotor assembly 540, the first rotor portion 548, or the second rotor portion 549. In such embodiments, the hydraulic actuator may comprise a port 560 configured to receive hydraulic fluid and in fluid communication with an oil channel 561. In various embodiments, the oil channel 561 may be at least partially disposed in the rotor shaft 530, and/or the rotor hub 543. In various embodiments, increased oil pressure through the oil channel 561 may displace at least one of the rotor assembly 540, the first rotor portion 548, or the second rotor portion 549 in an axial direction along the axis of rotation 102.

In various embodiments, the hydraulic actuator may be an active actuator. In various embodiments, the hydraulic actuator may be controlled by a controller configured to adjustably communicate hydraulic fluid through oil channel 561. In various embodiments, the controller may comprise a processor configured to implement various logical operations in response to execution of instructions, for example, instructions stored on a non-transitory, tangible, computer-readable medium.

In various embodiments, the rotor hub 543 may operatively couple to at least one of the rotor assembly 540, the first rotor portion 548, or the second rotor portion 549 and may be configured to bring the hydraulic actuator into fluid communication therewith. In such embodiments, the rotor hub 543 may couple to at least one of the rotor assembly 540, the first rotor portion 548, or the second rotor portion 549 by way of at least one rotor hub projection 544 that engages at least one mating rotor assembly aperture 552. In various embodiments, the rotor hub projection 544 may comprise a generally cylindrical projection that engages a generally cylindrical mating rotor assembly aperture 552. In various embodiments, the rotor hub 543 couples to the rotor assembly 540 by way of a plurality of rotor assembly apertures and rotor hub projections. In various embodiments, the rotor assembly aperture may comprise a generally annular aperture that engages a generally annular mating rotor hub projection.

In various embodiments, the hydraulic actuator and the oil channel 561 may be in fluid communication with the rotor hub projection 544 and the rotor assembly aperture 552 such that communication of oil into the rotor hub projection 544 translates at least one of the rotor assembly 540, the first rotor portion 548, or the second rotor portion 549 in an axial direction away from the axial plane 104 and out of axial engagement with the stator 520. Accordingly, in various embodiments, an axial position of at least one of the rotor assembly 540, the first rotor portion 548, or the second rotor portion 549 may be adjustably controlled by the hydraulic actuator.

Figure 6:
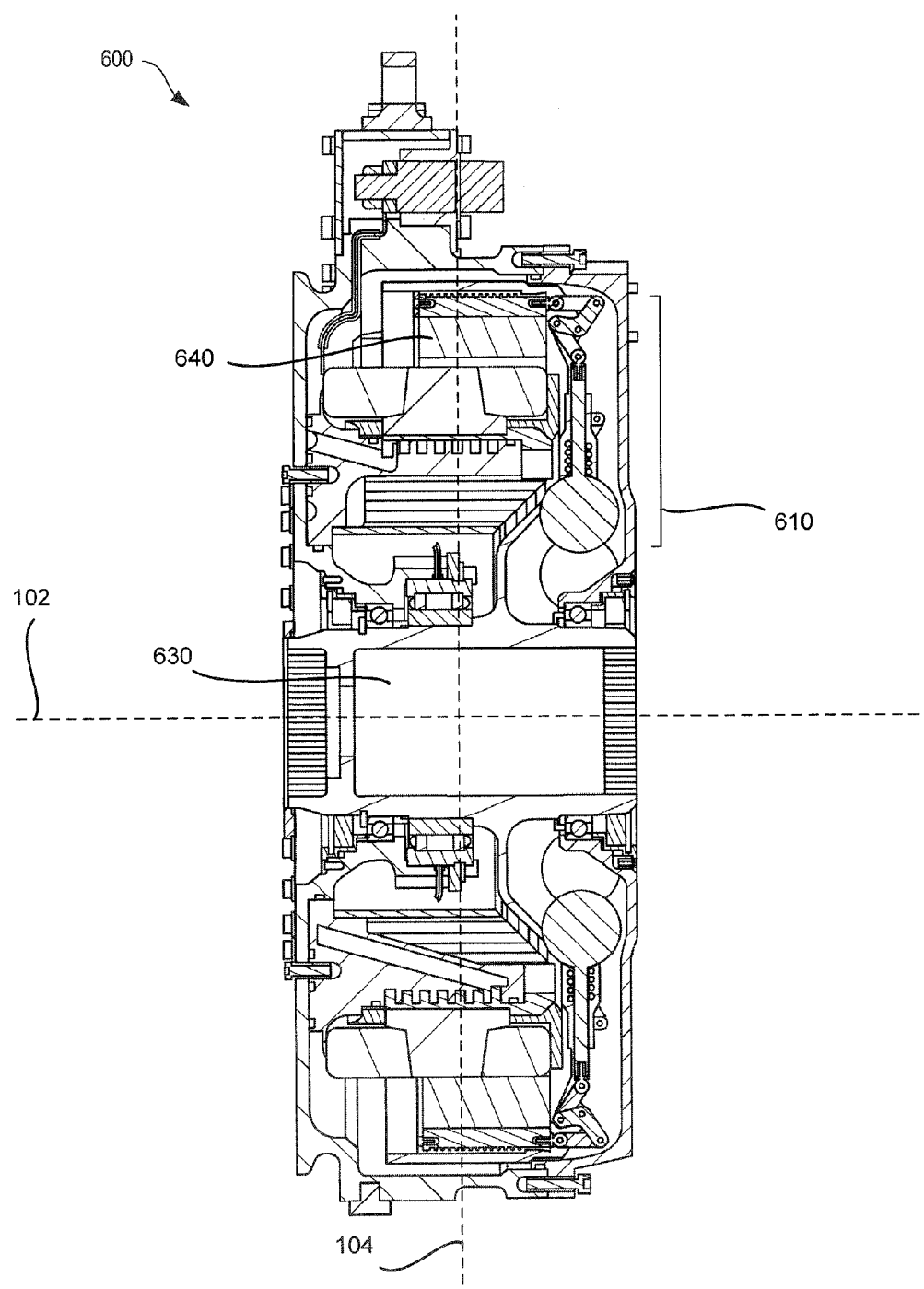
FIG. 6 illustrates a cross section view of a passive axial engagement-controlled variable damper in accordance with various embodiments.
Figure 7A:
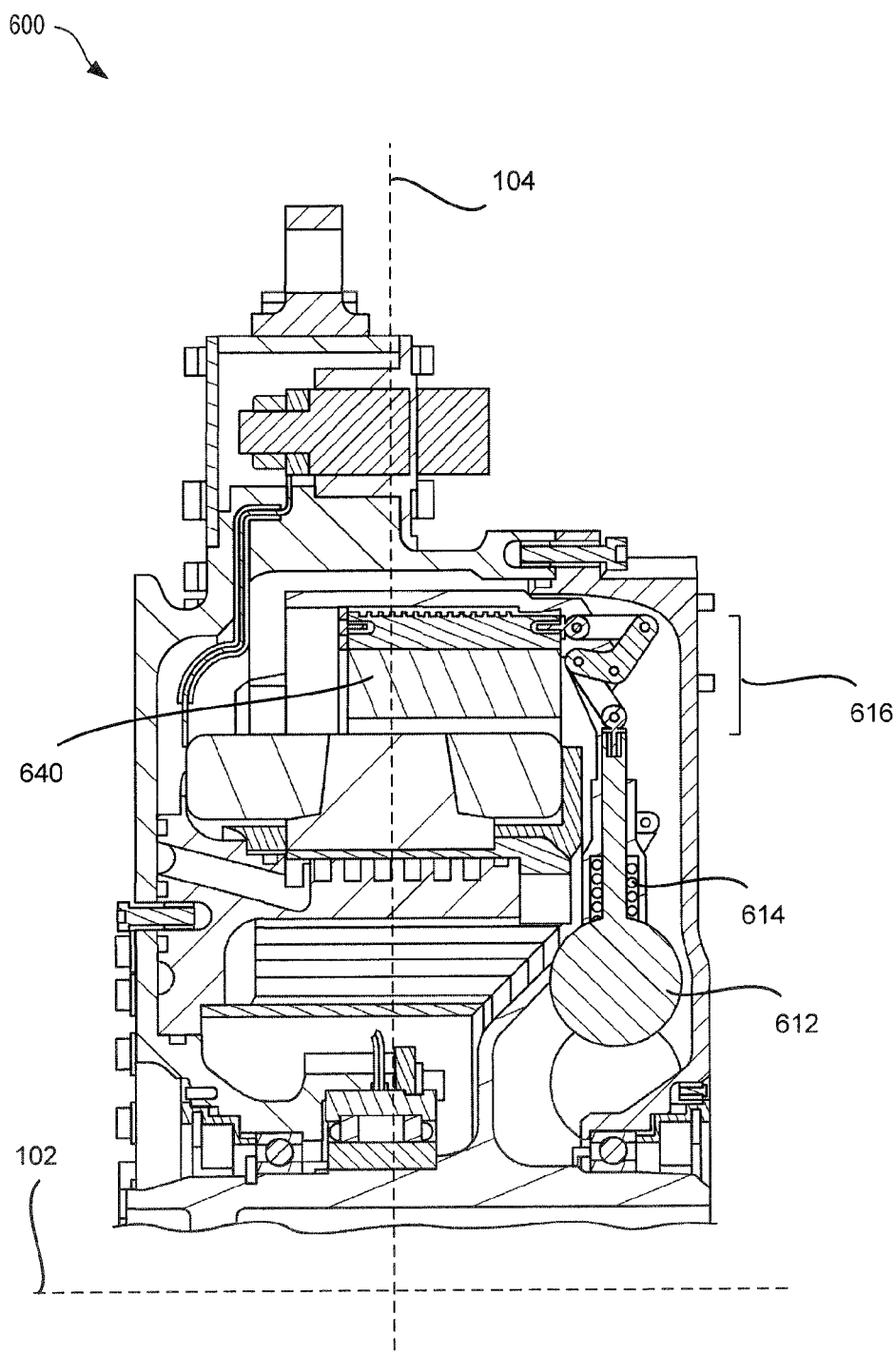
FIG. 7a illustrates a close-up cross section view of a portion of a passive axial engagement-controlled variable damper in accordance with various embodiments.
Figure 7B:
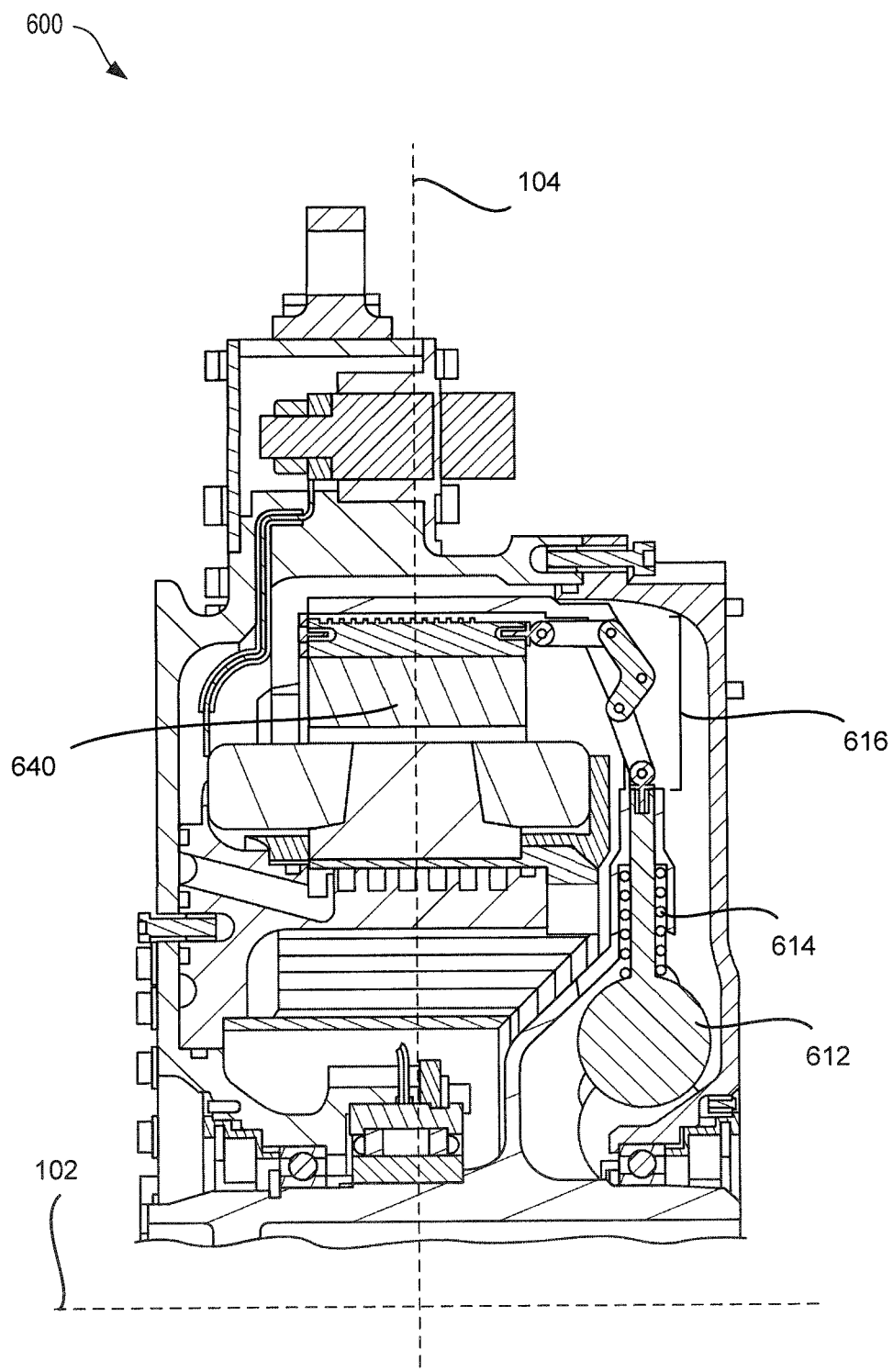
FIG. 7b illustrates another close-up cross section view of a portion of a passive axial engagement-controlled variable damper in accordance with various embodiments.

In various embodiments, the hydraulic actuator may be a passive actuator. In various embodiments, the hydraulic actuator may adjustably communicate hydraulic fluid through oil channel 561 in response to rotation of the rotor shaft 530. In various embodiments and with reference to FIGS. 6, 7a, and 7b, the rotor actuator may comprise a flyweight actuator 610. In various embodiments, the flyweight actuator 610 may comprise a flyweight mass 612 disposed radially inward of the rotor assembly 640 and operatively coupled to a portion of the axial engagement-controlled variable damper 600 configured for axial translation along the axis of rotation 102. In various embodiments, the flyweight actuator 610 may be configured to rotate with the rotor shaft 630 about the axis of rotation 102. In various embodiments, the flyweight actuator 610 may be operatively coupled to at least one of the rotor assembly 640, the first rotor portion 548, or the second rotor portion 549 (with momentary reference to FIGS. 5a and 5b).

In various embodiments the flyweight spring 614 may act on the flyweight mass 612 in a radially inward direction. In various embodiments, during rotation of the rotor shaft 630 and the flyweight actuator 610, the flyweight mass 612 may translate radially outward from the axis of rotation 102, causing compression of the flyweight spring 614 and axial translation of at least one of the rotor assembly 640, the first rotor portion 548, or the second rotor portion 549 (with momentary reference to FIGS. 5a and 5b). In various embodiments, the flyweight hinges 616 may be configured such that translation of the flyweight mass 612 causes displacement of at least one of the rotor assembly 640, the first rotor portion 548, or the second rotor portion 549 (with momentary reference to FIGS. 5a and 5b). In various embodiments, the flyweight hinges 616 may be adjusted and/or configured to achieve a desired axial position of at least one of the rotor assembly 640, the first rotor portion 548, or the second rotor portion 549 (with momentary reference to FIGS. 5a and 5b) and, accordingly, a desired damping performance of the axial engagement-controlled variable damper 600.

Various embodiments described hereinbefore comprise a rotor assembly having a conventional configuration, wherein permanent magnets are arranged in a generally cylindrical pattern facing radially outward from the axis of rotation toward the stator. One skilled in the art will appreciate that in various embodiments, any of the hereinbefore described embodiments may comprise an axial engagement-controlled variable damper having an "inside out" configuration. Stated differently, in various embodiments, an axial engagement-controlled variable damper may comprise a stator disposed radially inward of a rotor assembly, the rotor assembly comprising permanent magnets arranged in a generally cylindrical pattern facing radially inward towards the stator.

Figure 9:
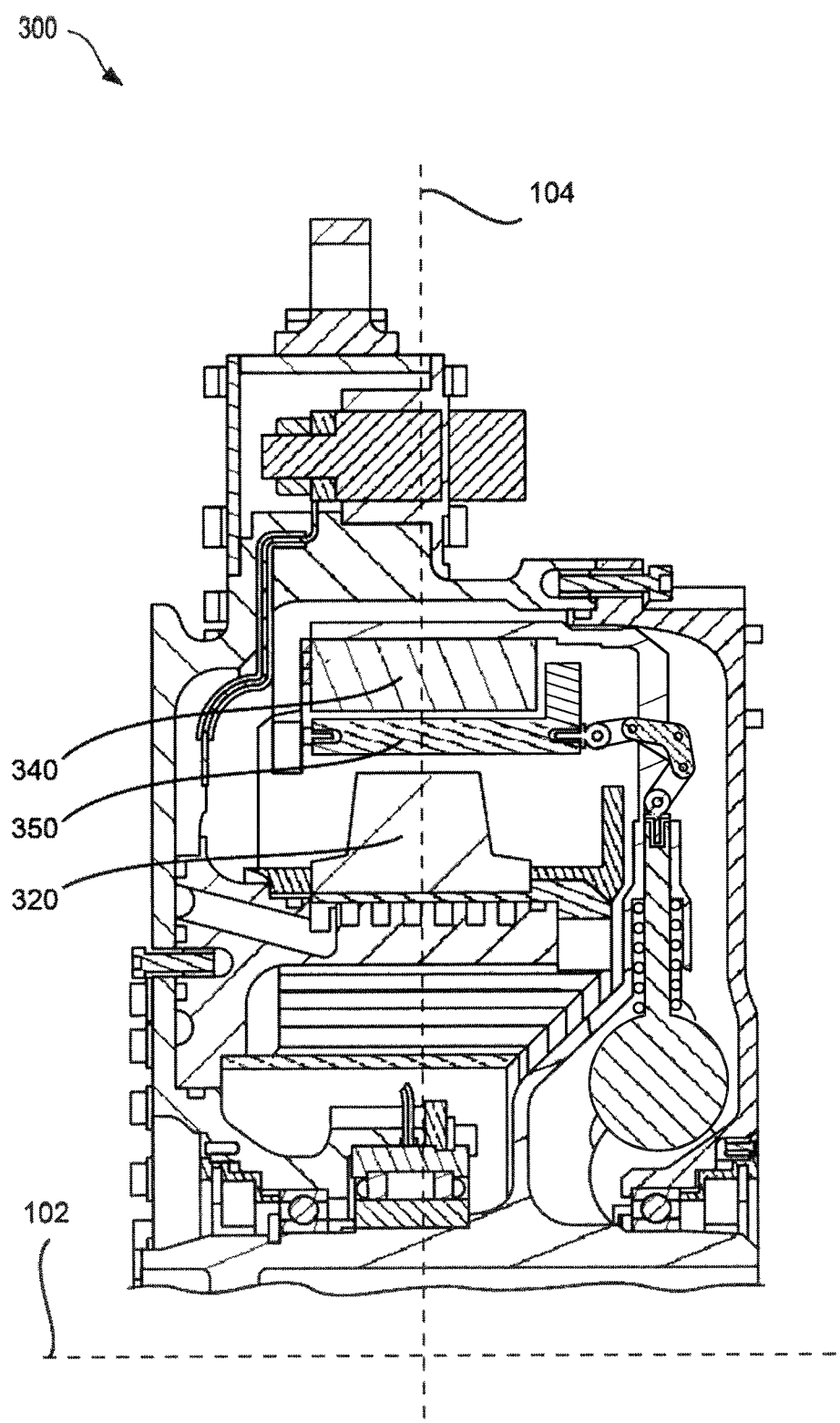
FIGS. 9-10. illustrate a close-up cross section view of an axial engagement-controlled variable damper with an inside-out configuration in accordance with various embodiments.
Figure 10:
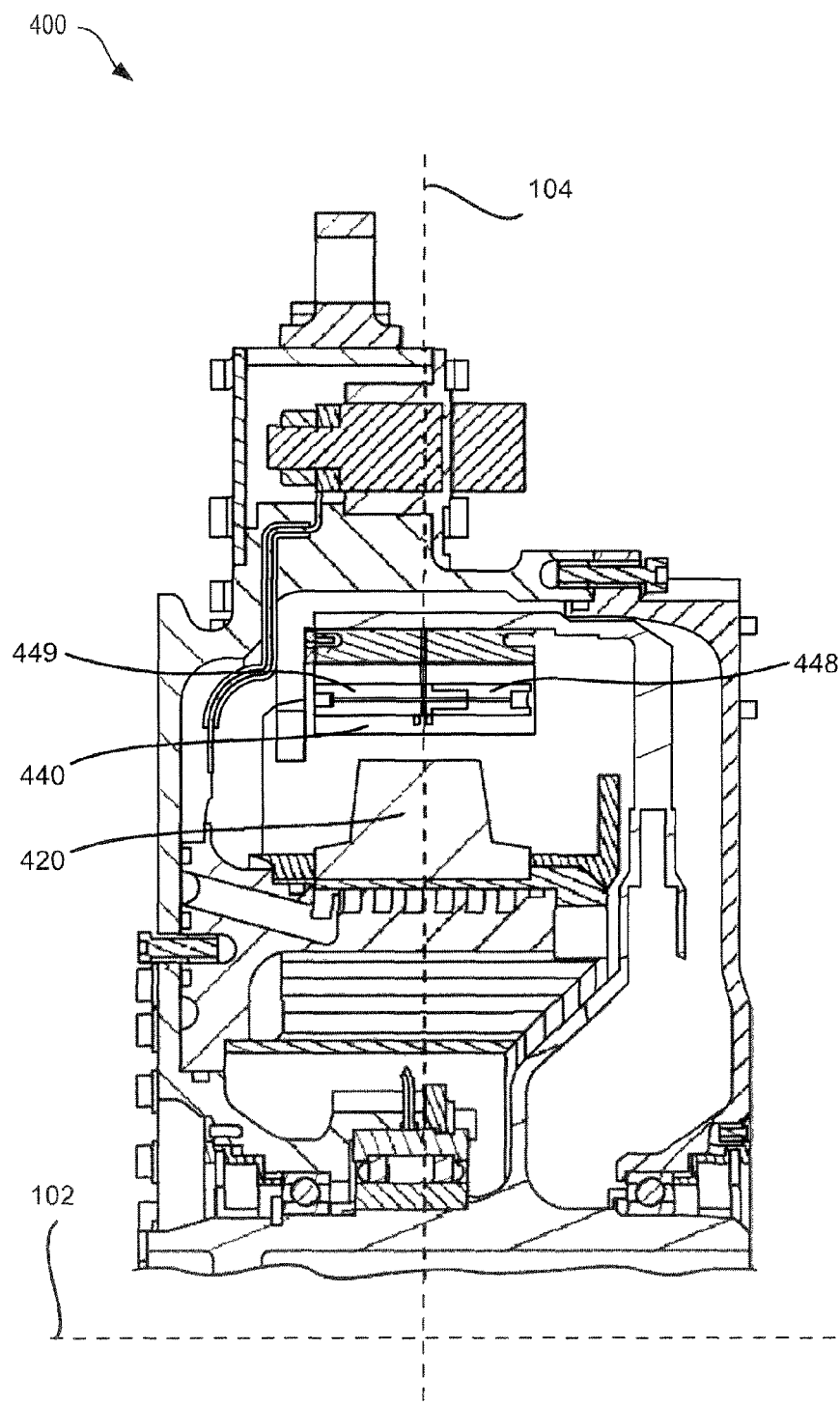

With reference to FIG. 9, an axial engagement-controlled variable damper 300 may comprise a stator 320 disposed radially inward of a rotor assembly 340 and a flux sleeve 350. With reference to FIG. 10, an axial engagement-controlled variable damper 400 may comprise a stator 420 disposed radially inward of a rotor assembly 440. In various embodiments, rotor assembly 440 may comprise a first rotor portion 448 and a second rotor portion 449.

Figure 8:
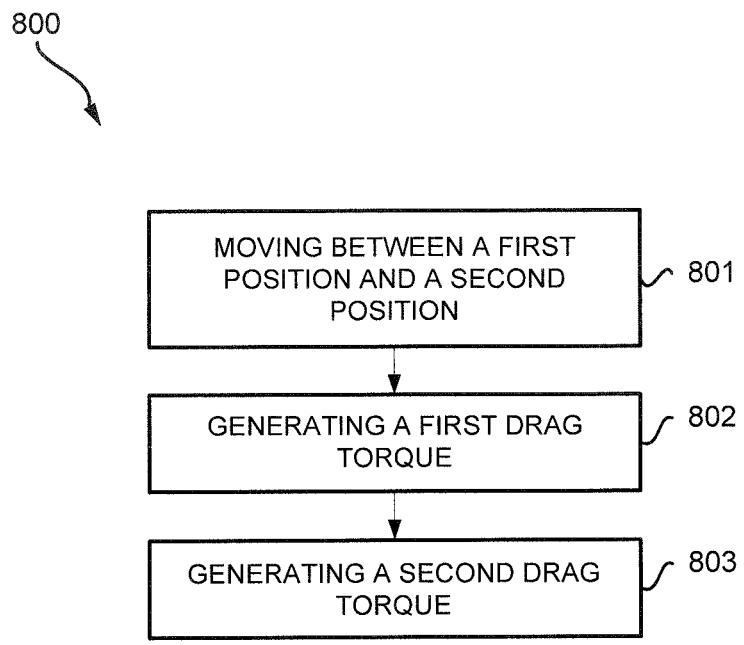
FIG. 8. illustrates a method of using an axial engagement-controlled variable damper in accordance with various embodiments.

With reference to FIG. 8, in various embodiments, a method 800 may allow variable control of drag torque generated by an axial engagement-controlled variable damper. In various embodiments, the degree of axial engagement between a stator and a rotor assembly may be directly proportional to the drag torque generated by the axial engagement-controlled variable damper. In various embodiments, the degree of axial engagement between a stator and a rotor assembly may be controlled, adjusted, and/or varied by moving a flux sleeve or a portion of the rotor assembly relative to the stator. In various embodiments, drag torque generated by an axial engagement-controlled variable damper is continuously variable.

In various embodiments, the method 800 may comprise moving a portion of the axial engagement-controlled variable damper between at least a first position and a second position (Step 801). In various embodiments, the method 800 may comprise moving the flux sleeve 250 between at least a first position and a second position. In various embodiments, the moving causes an increase in axial engagement between the stator 220 and the rotor assembly 240 through axial translation of the flux sleeve 250 away from the axial plane 104. In various embodiments, the moving causes a decrease in axial engagement between the stator 220 and the rotor assembly 240 through axial translation of the flux sleeve 250 toward the axial plane 104.

In various embodiments, the method 800 may comprise moving at least one of the rotor assembly 540, the first rotor portion 548, or the second rotor portion 549 between at least a first position and a second position. In various embodiments, the moving causes an increase in axial engagement between the stator 520 and the rotor assembly 540 through axial translation of at least a portion of the rotor assembly 540 toward the axial plane 104. In various embodiments, the moving causes a decrease in axial engagement between the stator 520 and the rotor assembly 540 through axial translation of at least a portion of the rotor assembly 540 away from the axial plane 104.

In various embodiments, the method 800 further comprises generating a first drag torque in response to at least one of the flux sleeve and at least a portion of the rotor assembly being in the first position (Step 802). In various embodiments, the method 800 may further comprise generating a second drag torque in response to at least one of the flux sleeve and at least a portion of the rotor assembly being in the second position (Step 803).

In various embodiments, the generating may be by an axial engagement-controlled variable damper 200 comprising a flux sleeve 250. In various embodiments, the generating may be by an axial engagement-controlled variable damper 500 comprising a rotor assembly 540 configured for axial translation.

In various embodiments, in response to the moving increasing axial engagement between the stator and at least a portion of the rotor assembly, the first drag torque is greater than the second drag torque. In various embodiments, in response to the moving decreasing axial engagement between the stator and at least a portion of the rotor assembly, the first drag torque is greater than the second drag torque. Stated differently, in various embodiments, an amount of drag torque generated by the axial engagement-controlled variable damper may be inversely proportional to an amount of axial engagement between the stator and at least a portion of the rotor assembly. In various embodiments, an axial position of at least one of the flux sleeve and at least a portion of the rotor assembly may be continuously variable. In various embodiments the amount of axial engagement between the stator and at least a portion of the rotor assembly may be continuously variable. In various embodiments, a continuously variable amount of axial engagement between the stator and at least a portion of the rotor assembly may generate a continuously variable drag torque.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Devices and methods are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of

What is claimed is:

1. An axial engagement-controlled variable damper comprising:
   a rotor assembly coupled to a rotor shaft and disposed about an axis of rotation;
   a stator, coaxially aligned with, and disposed radially inward of, the rotor assembly; and
   a flux sleeve, axially movable relative to the rotor assembly between at least a first position and a second position and having a circumferential flange portion disposed radially inward of the rotor assembly and radially outward of the stator, the flux sleeve being configured to alter magnetic coupling between the stator and the rotor assembly in response to being moved axially, the axial-engagement controlled variable damper being configured to generate a first drag torque in response to the flux sleeve being in the first position and a second drag torque in response to the flux sleeve being in the second position.

2. The axial engagement-controlled variable damper of claim 1, wherein at least one of the first drag torque and the second drag torque is continuously variable.

3. The axial engagement-controlled variable damper of claim 1, further comprising:
   an additional flux sleeve being axially movable relative to the rotor assembly and having an additional circumferential flange portion disposed radially inward of the rotor assembly and radially outward of the stator.

4. The axial engagement-controlled variable damper of claim 3, further comprising at least one flux sleeve actuator configured to move at least one of the flux sleeve and the additional flux sleeve.

5. The axial engagement-controlled variable damper of claim 4, wherein the at least one flux sleeve actuator comprises a passive actuator.

6. The axial engagement-controlled variable damper of claim 4, wherein the at least one flux sleeve actuator comprises a hydraulic actuator.

7. The axial engagement-controlled variable damper of claim 6, further comprising a rotor hub.

8. The axial engagement-controlled variable damper of claim 3, wherein the stator comprises at least one of a plurality of laminations or a conductive winding.

9. An axial engagement-controlled variable damper comprising:
   a stator disposed about an axis of rotation;
   a rotor assembly, coaxially aligned with, and disposed about, the stator, the rotor assembly being axially movable relative to the stator between at least a first position and a second position, the axial engagement-controlled variable damper being configured to generate a first drag torque in response to magnetic coupling between the stator and the rotor assembly when the rotor assembly is in the first position and to generate a second drag torque in response to the rotor assembly being in the second position.

10. The axial engagement-controlled variable damper of claim 9, wherein the rotor assembly comprises a first rotor portion and a second rotor portion.

11. The axial engagement-controlled variable damper of claim 10, further comprising at least one rotor actuator.

12. The axial engagement-controlled variable damper of claim 11, wherein the rotor actuator comprises a passive actuator.

13. The axial engagement-controlled variable damper of claim 11, wherein the rotor actuator comprises a hydraulic actuator.

14. The axial engagement-controlled variable damper of claim 13, further comprising a rotor hub.

15. The axial engagement-controlled variable damper of claim 11, wherein the stator comprises at least one of a plurality of laminations or a conductive winding.

16. A method comprising:
   moving at least one of a flux sleeve and at least a portion of a rotor assembly between a first position and a second position relative to a stator of an axial engagement-controlled variable damper; and
   generating a first drag torque in response to the at least one of the flux sleeve and at least a portion of the rotor assembly being in the first position and a second drag torque in response to the at least one of the flux sleeve and at least a portion of the rotor assembly being in the second position; wherein the axial engagement-controlled variable damper being configured to generate the first drag torque and the second drag torque.

17. The method of claim 16, wherein, in response to the moving increasing axial engagement between the stator and at least a portion of the rotor assembly, the first drag torque is greater than the second drag torque.

18. The method of claim 16, wherein, in response to the moving decreasing axial engagement between the stator and at least a portion of the rotor assembly, the first drag torque is less than the second drag torque.

19. The method of claim 16, wherein the axial engagement-controlled variable damper comprises:
   the rotor assembly coupled to a rotor shaft and disposed about an axis of rotation;
   a stator, coaxially aligned with, and disposed radially inward of, the rotor assembly; and the flux sleeve, axially movable relative to the rotor assembly between at least the first position and the second position and having a circumferential flange portion disposed radially inward of the rotor assembly and radially outward of the stator, the flux sleeve being configured to alter magnetic coupling between the stator with the rotor assembly in response being moved axially, the axial-engagement controlled variable damper being configured to generate the first drag torque in response to the flux sleeve being in the first position and the second drag torque in response to the flux sleeve being in the second position.

20. The method of claim 16, wherein the axial engagement-controlled variable damper comprises:
   a stator disposed about an axis of rotation;
   the rotor assembly, coaxially aligned with, and disposed about, the stator, the rotor assembly being axially movable relative to the stator between at least the first position and the second position, the axial engagement-controlled variable damper being configured to generate the first drag torque in response to magnetic coupling between the stator and the rotor assembly when the rotor assembly is in the first position and to generate the second drag torque in response to the rotor assembly being in the second position.

* * * * *